(12) United States Patent
Zhang et al.

(10) Patent No.: US 11,524,332 B2
(45) Date of Patent: Dec. 13, 2022

(54) ARRAY-SPRAYING ADDITIVE MANUFACTURING APPARATUS AND METHOD FOR MANUFACTURING LARGE-SIZED EQUIAXED CRYSTAL ALUMINUM ALLOY INGOT

(71) Applicant: SHANGHAI JIAOTONG UNIVERSITY, Shanghai (CN)

(72) Inventors: Jiao Zhang, Shanghai (CN); Baode Sun, Shanghai (CN); Qing Dong, Shanghai (CN)

(73) Assignee: SHANGHAI JIAOTONG UNIVERSITY, Shanghai (CN)

( * ) Notice: Subject to any disclaimer, the term of this patent is extended or adjusted under 35 U.S.C. 154(b) by 0 days.

(21) Appl. No.: 17/288,038

(22) PCT Filed: Dec. 20, 2018

(86) PCT No.: PCT/CN2018/122252
§ 371 (c)(1),
(2) Date: Apr. 23, 2021

(87) PCT Pub. No.: WO2020/098065
PCT Pub. Date: May 22, 2020

(65) Prior Publication Data
US 2021/0362217 A1  Nov. 25, 2021

(30) Foreign Application Priority Data
Nov. 16, 2018  (CN) .......................... 201811363977.4

(51) Int. Cl.
*B22D 23/00*  (2006.01)
*B22D 7/00*  (2006.01)
(Continued)

(52) U.S. Cl.
CPC .......... *B22D 7/005* (2013.01); *B22D 23/003* (2013.01); *B22D 25/00* (2013.01); *B33Y 10/00* (2014.12);
(Continued)

(58) Field of Classification Search
CPC ........ B22D 23/003; C23C 4/123; B33Y 30/00
See application file for complete search history.

(56) References Cited

U.S. PATENT DOCUMENTS

2014/0336680 A1  11/2014  Medina et al.
2017/0100772 A1  4/2017  Johnston
2018/0297269 A1  10/2018  Johnson et al.

FOREIGN PATENT DOCUMENTS

CN  204644435  9/2015
CN  105345004  2/2016
(Continued)

OTHER PUBLICATIONS

International Search Report and Written Opinion from Chinese PCT Application No. PCT/CN2018/122252 dated Jul. 10, 2019 (English Translation).
(Continued)

*Primary Examiner* — Jacob J Cigna
(74) *Attorney, Agent, or Firm* — Hogan Lovells US LLP

(57) ABSTRACT

An array-spraying additive manufacturing apparatus and method for manufacturing a large-sized equiaxed crystal aluminum alloy ingot, comprising: a liquid aluminum spraying mechanism having array nozzles disposed in an atmospheric pressure chamber, a movable condensing mechanism disposed in the atmospheric pressure chamber below the liquid aluminum spraying mechanism, and a control mechanism. The control mechanism sends an upward guiding command to a release mechanism and issues a three-dimensional movement command to the movable condens-
(Continued)

ing mechanism, such that liquid aluminum in the liquid aluminum spraying mechanism is sprayed at the surface of the movable condensing mechanism in a continuous array of liquid flows according to a preset path and is rapidly condensed to form an ingot. Also disclosed is an additive manufacturing method employing the apparatus.

8 Claims, 2 Drawing Sheets

(51) Int. Cl.
| | | |
|---|---|---|
| *B33Y 10/00* | (2015.01) | |
| *C23C 4/123* | (2016.01) | |
| *C23C 4/18* | (2006.01) | |
| *B22D 25/00* | (2006.01) | |
| *B33Y 30/00* | (2015.01) | |
| *B33Y 70/00* | (2020.01) | |
| *B33Y 80/00* | (2015.01) | |

(52) U.S. Cl.
CPC ............... *B33Y 30/00* (2014.12); *B33Y 70/00* (2014.12); *B33Y 80/00* (2014.12); *C23C 4/123* (2016.01); *C23C 4/185* (2013.01)

(56) References Cited

FOREIGN PATENT DOCUMENTS

| CN | 105499578 | 4/2016 |
|---|---|---|
| CN | 106111985 | 11/2016 |
| CN | 106493942 | 3/2017 |
| CN | 108405863 | 8/2018 |
| CN | 108788034 | 11/2018 |
| CN | 108788102 | 11/2018 |
| CN | 108788155 | 11/2018 |
| JP | 2003103355 | 4/2003 |
| JP | 2016123997 | 7/2016 |
| RU | 2642654 | 1/2018 |

OTHER PUBLICATIONS

First Chinese Office Action from Chinese Application No. 201811363977.4 (English Translation).
Second Chinese Office Action from Chinese Application No. 201811363977.4 (English Translation).
Third Chinese Office Action from Chinese Application No. 201811363977.4 (English Translation).
Third Chinese Office Action from Chinese Application No. 201811363977.4 (Chinese and English Translation).
Notice of Reasons for Refusal issued in JP Patent Application No. 2021-509862, dated Aug. 11, 2021.
Decision to Grant a Patent issued in JP Patent Application No. 2021-509862, dated Dec. 14, 2021.
Communication pursuant to Article 94(3) EPC issued in EP Application No. 18 940 117.7-1103, dated Nov. 10, 2021.
Written Opinion issued in PCT Application No. PCT/CN2018/122252, dated Aug. 9, 2019.
Decision to Grant a Patent issued in RU Patent Application No. 2021114031/05, dated Dec. 29, 2021.

ARRAY-SPRAYING ADDITIVE MANUFACTURING APPARATUS AND METHOD FOR MANUFACTURING LARGE-SIZED EQUIAXED CRYSTAL ALUMINUM ALLOY INGOT

TECHNICAL FIELD

The present disclosure relates to the technical field of metallurgy, and in particular to an array-spraying additive manufacturing apparatus and method for manufacturing large-sized equiaxed crystal aluminum alloy ingot.

BACKGROUND ART

Semi-continuous casting is a process, conventionally used in industry, for manufacturing large-size aluminum alloy ingots, mainly comprising two methods: one being hot top casting, and the other being direct chill casting. The advantage of hot top casting is that the liquid level is stable during the casting process, but a relatively-deep liquid cavity is generated in the center of the ingot, and the solidified structure contains a large area of columnar crystal zone. Macroscopic segregation is severe from the center to the edge of the ingot, and relatively-high internal stress remains, so that the ingot is easy to crack with low yield, which is not suitable for the production of aluminum alloy ingot with high alloy content. The advantage of direct chill casting is that it can greatly reduce the depth of the liquid cavity at the center of the ingot, thereby reducing the macroscopic segregation and internal stress of the ingot; nevertheless, during the casting process, liquid level is unstable and slag entrapment occurs easily, and columnar crystal zone also becomes inevitable. Therefore, it is extremely difficult to prepare large-size ingots with good homogeneity by conventional processes.

The additive manufacturing has changed the casting mode of large-volume solidification of liquid aluminum. Large-sized ingots are prepared by continuous melting and superposition of microelement zones to avoid the formation of liquid cavity. At the same time, the increase in cooling speed is conducive to the formation of equiaxed crystal structure and overcomes a range of shortcomings of conventional casting methods. At present, the typical methods mainly comprise spray forming and selective laser remelting. Spray forming can be used to prepare ingots without macroscopic segregation of components, but the aluminum ingots prepared by this method have high porosity, with non-compact structure and severe oxidation. The method of selective laser remelting does not have the issues above, and the solidified structure is ideal, nonetheless it is difficult to be applied in large-scale production of large-sized industrial ingot due to its low production efficiency, long time required, and high cost. In the prior art, there is a metal droplet additive manufacturing method for direct deposition and formation by using a magnetic field to control charged metal droplets. But due to low forming efficiency of metal droplets, it is impossible to be used for the production of large-sized ingots. At present, there is no method to form large-sized and special-shaped ingots with segregation-free equiaxed crystal structure by making large-volume melts sprayed via generating negative pressure to form a stable continuous metal liquid column, and quickly condensed.

SUMMARY

Given the foregoing shortcomings in the prior art, the present disclosure provides an array-spraying additive manufacturing apparatus and method for manufacturing large-sized equiaxed crystal aluminum alloy ingot, which sprays large-volume melts by generating negative pressure so as to form a stable continuous metal liquid column, makes, through a design of an array arrangement of multiple nozzles, large-volume liquid aluminum evenly dispersed to form dozens to even hundreds of continuous liquid flows, and enables, by combining three-dimensional movement of a rapid condensing table below, large-area spreading of the thin liquid aluminum which is then continuously solidified to form ingots. The method has high production efficiency and can prepare an ultra-large-sized aluminum alloy ingots, the solidified structure of which is an equiaxed crystal and which has no macroscopic segregation.

The present disclosure is realized through the following technical solutions.

The present disclosure comprises: a liquid aluminum spraying mechanism having array nozzles and disposed in an atmospheric pressure chamber, and a movable condensing mechanism and a controller which are disposed in the atmospheric pressure chamber and below the liquid aluminum spraying mechanism, wherein the controller sends an upward guiding command to a release controller and issues a three-dimensional movement command to the movable condensing mechanism respectively, such that liquid aluminum in the liquid aluminum spraying mechanism is sprayed to the surface of the movable condensing mechanism in a form of a continuous array of liquid flows according to a preset path and is rapidly condensed to form the ingot.

The atmospheric pressure chamber is provided with a vacuum pump connected to the controller, and the internal air pressure is further adjusted through the vacuum pump.

The atmospheric pressure chamber is connected with an inert gas source to provide inert gas protection for inside of the chamber.

The liquid aluminum spraying mechanism comprises: the release controller, a liquid aluminum chamber, and the array nozzles, wherein the array nozzles are disposed at the bottom of the liquid aluminum chamber, and the release controller is connected with the controller to control the starting and ending of the liquid aluminum spraying process.

The release controller comprises an upward movement controller and plug pole, wherein the plug pole is matched with the array nozzles, and the upward movement controller is respectively connected with the plug pole and the controller to receive a release command and control the plug pole to lift upward to release the array nozzles.

In-chamber heaters which are connected with the controller are further disposed inside the liquid aluminum chamber.

A liquid level meter is disposed in the liquid aluminum chamber.

A liquid inlet trench with a gate is disposed at one side of the liquid aluminum chamber in order to allow input of the liquid aluminum.

A thermal insulation structure is disposed outside the liquid aluminum chamber.

Nozzle heaters are further disposed outside of the array nozzles.

The movable condensing mechanism comprises: a condensing table disposed right facing the array nozzles, a two-dimensional movement controller which is vertically movable and disposed under the condensing table, and a downward movement controller, wherein the two-dimensional movement controller and the downward movement controller respectively are connected to the controller and receive two-dimensional movement command and vertical movement command so as to realize three-dimensional movement.

The setting of being vertically movable is realized by the downward movement controller disposed under the two-dimensional movement controller.

A cooling liquid flow channel is disposed inside the condensing table.

The controller comprises: a movement controller and a general controller, wherein the movement controller is connected to the general controller and transmits movement information of the movable condensing mechanism, and the general controller is connected with the release controller and the vacuum pump respectively, and transmits the information of the movement of the release controller and the information of the opening and closing of the vacuum pump; is connected with the two-dimensional movement controller and transmits the movement information of the two-dimensional movement controller; and is connected with the downward movement controller and transmits the movement information of the downward movement controller.

The present disclosure relates to an array-spraying additive manufacturing method for manufacturing large-sized equiaxed crystal aluminum alloy ingot based on the above apparatuses, comprising the following steps:

Step 1: placing the plug pole at the lowest position to make the nozzles in a closed state; turning on the in-chamber heaters for performing preheating to reach a liquid aluminum temperature and keeping the temperature, opening an inlet gate to allow the liquid aluminum to flow into the liquid aluminum chamber, and closing the inlet gate after the liquid aluminum is controlled by a liquid level meter to reach a preset height, turning on the nozzle heaters to preheat the nozzles, sealing an airtight condensing chamber, and turning on the vacuum pump to vacuum the airtight condensing chamber; and turning off the vacuum pump when the vacuum degree meets the requirement, and introducing inert gas from the inert gas source to reach a preset pressure;

Step 2: turning on cooling water, controlling the downward movement controller by the movement controller to make a distance between the nozzles and the condensing table reach a preset distance, then turning on the two-dimensional movement controller to enable the nozzles to move relative to the condensing table periodically and repeatedly; turning on the upward movement controller to lift upward the plug pole, so as to make the liquid aluminum enter the nozzles; turning on the vacuum pump to perform pumping to make the pressure of the airtight condensing chamber less than 1 atm, wherein the liquid aluminum is sprayed out as stable liquid columns through the nozzles under the above-mentioned negative pressure generated inside the airtight condensing chamber, and sprayed to the condensing table to form an ingot; and controlling, after the ingot preparation starts, the downward movement controller to move the condensing table downward, wherein during the ingot preparation process, with continuous consumption of the liquid aluminum, when the liquid level in the liquid aluminum chamber drops to a warning level, the inlet gate is opened to replenish the liquid aluminum until reaching a stable level, and then the inlet gate is closed; and Step 3: turning off, upon preparation of the ingots is completed, the plug pole to block flowing of the liquid aluminum out from the nozzles, turning off the two-dimensional movement controller and the downward movement controller, turning off a heating power supply, and turning off the cooling water after the ingots are cooled, thus finishing the preparation process.

Technical Effects

Compared with the prior art, the present disclosure sprays a large volume of melts by generating negative pressure so as to form a stable continuous metal liquid column, making, through a design of an array arrangement of multiple nozzles, large-volume liquid aluminum evenly dispersed to form dozens to even hundreds of continuous liquid flows, and enables, by combining three-dimensional movement of a rapid condensing table below, large-area spreading of the thin liquid aluminum which is then continuously solidified to form ingots.

Figure 1:
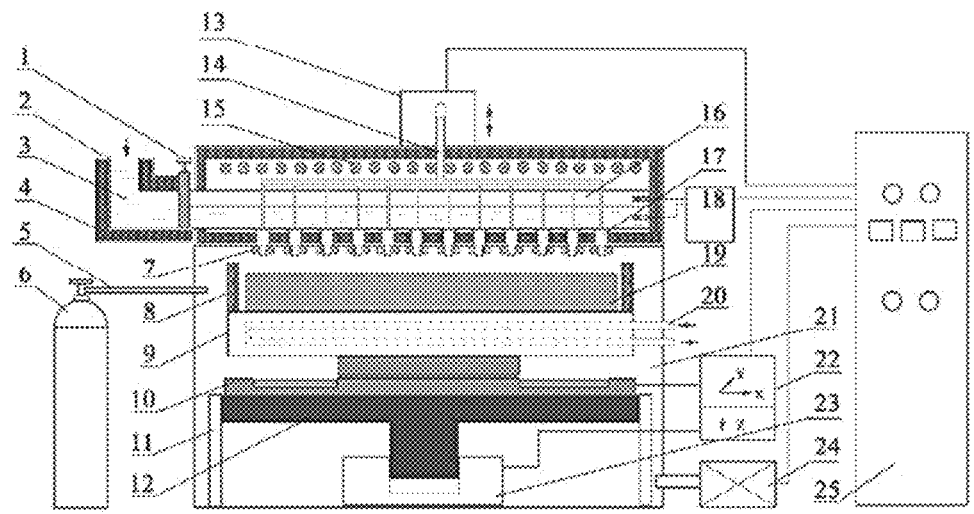
FIG. 1 is a schematic diagram of the structure of the present disclosure.

In the Figures: inlet gate 1; diversion trench 2; liquid aluminum 3; thermal insulation layer 4; gas inlet pipe 5; inert gas 6; nozzle heater 7; baffle plate 8; condensing table 9; two-dimensional movement controller 10; guide rail 11; support table 12; upward movement controller 13; plug pole 14; in-chamber heater 15; liquid aluminum chamber 16; nozzle 17; liquid lever meter 18; ingot 19; cooling water tube 20; airtight condensing chamber 21; movement controller 22; downward movement controller 23; vacuum pump 24; general controller 25.

DETAILED DESCRIPTION OF EMBODIMENTS

Example 1

As indicated in FIG. 1, the example relates to an array-spraying additive manufacturing apparatus for manufacturing large-sized equiaxed crystal aluminum alloy ingot, comprising: an inlet gate 1, a diversion trench 2, liquid aluminum 3, a thermal insulation layer 4, a gas inlet pipe 5, inert gas 6, nozzle heaters 7, a baffle plate 8; a condensing table 9, a two-dimensional movement controller 10, a guide rail 11, a support table 12, an upward movement controller 13, a plug pole 14, in-chamber heaters 15, a liquid aluminum chamber 16; nozzles 17, a liquid lever meter 18; an ingot 19, a cooling water tube 20, an airtight condensing chamber 21, a movement controller 22, a downward movement controller 23, a vacuum pump 24, and a general controller 25.

The pressure of the liquid aluminum chamber is kept at 1 atm, and the airtight condensing chamber is completely sealed. The pressure P can be adjusted by the vacuum pump 24 and the gas inlet pipe. During ingot preparation, the pressure P is less than 1 atm.

Figure 2:
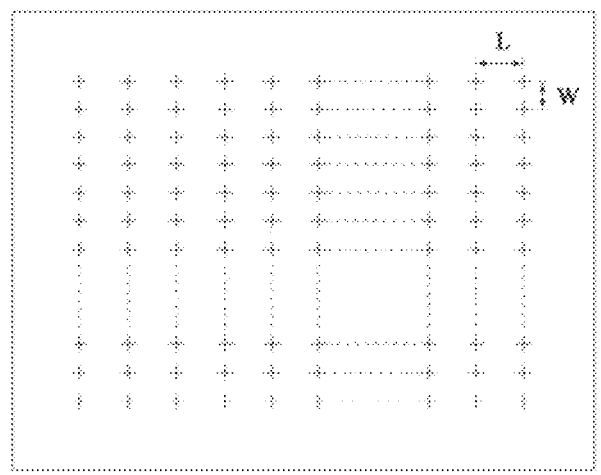
FIG. 2 is a schematic diagram of the structure of nozzles.

As shown in FIG. 2, the nozzles 17 are arranged in array, with the nozzles having row spacing of W (W<300 mm), the column spacing of L (L<300 mm), and the nozzle aperture of D (0.2 mm<D<30 mm).

Figure 3:
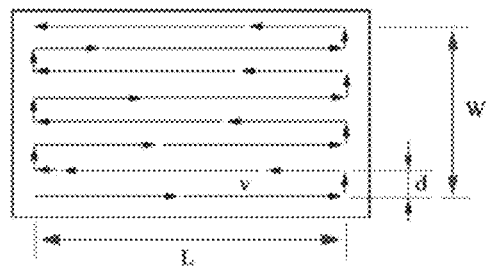
FIG. 3 is a schematic diagram of the movement path of a nozzle liquid column.

The two-dimensional movement controller 10 enables the translational movement of the condensing table in the horizontal X and Y directions, where the moving speed is v(v<1000 mm/s), and the maximum strokes in the two directions are X(X<1 m) and Y(Y<1 m) respectively. By movement, it is possible to allow the nozzle liquid column to move relative to the condensing table in a movement path similar to that shown in FIG. 3, whereas it is not limited to such movement path. The distance between adjacent passes is d(d<30 mm). As shown in FIG. 2 and FIG. 3, the single-pass movement length of a single nozzle is equal to the nozzle column spacing L, while the total width of the movement of a single nozzle is equal to the nozzle row spacing W.

The downward movement controller 13 enables the movement of the condensing table in the vertical direction, where the moving speed is $v_1(v_1<50$ mm/s), and the total stroke is Z(Z<5 m).

The present example relates to an array-spraying additive manufacturing method for manufacturing large-sized equiaxed crystal aluminum alloy ingot, comprising the following steps:

Step 1: placing the plug pole at the lowest position to make the nozzles in a closed state; turning on the in-chamber heaters for performing preheating to reach a liquid aluminum temperature $T_1(T_1>600°$ C.), and keeping the temperature, opening an inlet gate to allow the liquid aluminum to flow into the liquid aluminum chamber, and closing the inlet gate after the liquid aluminum is controlled by a liquid level meter to reach a preset height, turning on the nozzle heaters to preheat the nozzles, where the preheating temperature is $T_2(T_2>500°$ C.), sealing the airtight condensing chamber, and turning on the vacuum pump to vacuum the airtight condensing chamber; and turning off the vacuum pump when the vacuum degree meets the requirement, and introducing the inert gas from the gas inert tube to reach the pressure $P_1(P_1=1$ atm);

Step 2: turning on the cooling water, controlling the downward movement controller by the movement controller so as to make the distance between the nozzles and the condensing table reach H(H<50 cm), then turning on the two-dimensional movement controller to enable the nozzles to move relative to the condensing table periodically and repeatedly as shown in FIG. 2, turning on the upward movement controller to lift the plug pole, so as to make the liquid aluminum enter the nozzles; turning on the vacuum pump to perform pumping to make the pressure of the airtight condensing chamber be $P_2(P_2<1$ atm), wherein the liquid aluminum is sprayed out as stable liquid columns through the nozzles under the above-mentioned negative pressure generated inside the airtight condensing chamber, and sprayed onto the condensing table to form an ingot; and controlling, after the ingot preparation starts, the downward movement controller to move the condensing table downward at the velocity of $v_1(v_1<50$ mm/s), such that the height of the nozzles relative to the surface of the ingot remains at height H. During the ingot preparation process, with continuous consumption of the liquid aluminum, when the liquid level in the liquid aluminum chamber drops to a warning level, the inlet gate is opened to replenish the liquid aluminum until it reaches stable level, and then the inlet gate is closed;

Step 3: turning off, upon preparation of the ingots is completed, the plug pole to block flowing of the liquid aluminum out from the nozzles, turning off the two-dimensional movement controller and the downward movement controller, turning off the heating power supply, and turning off the cooling water after the ingots are cooled, thus finishing the preparation process.

Figure 4:
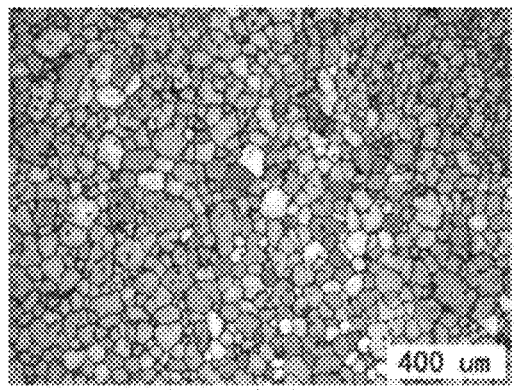
FIG. 4 is a metallographic photo of Example 1.
Figure 5:
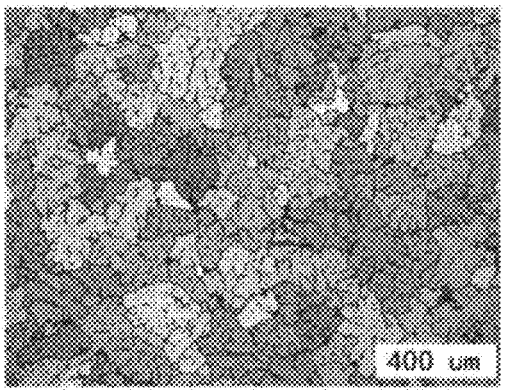
FIG. 5 is a metallographic photos illustrating semi-continuous casting.

When preparing a 7050 aluminum alloy ingot by the above-mentioned method, settings comprise: the liquid aluminum temperature being 680° C., the nozzle diameter being 8 mm, the horizontal moving speed of the condensing table being 300 mm/s, the spray area of the array nozzles being 2 m*5 m, and the thickness of the ingot being 0.5 m, and it takes 40 minutes to prepare a large-sized ingot of 2 m*5 m*0.5 m. The solidified structure of the ingot is dense, without macroscopic segregation, and is equiaxed crystal with an average grain size of 60-80 μm, as shown in FIG. 4. FIG. 5 shows the grain structure of the ingot prepared by semi-continuous casting. By comparison, the grain structure of the ingot prepared by the present method is significantly more refined.

Example 2

Figure 6:
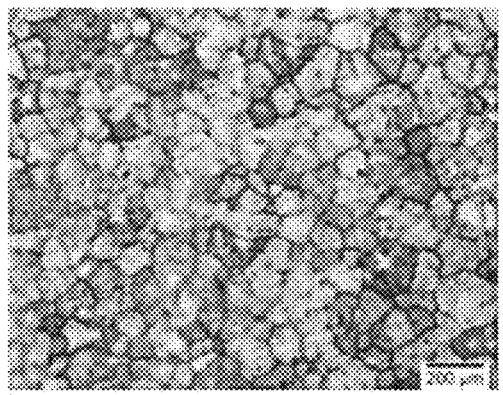
FIG. 6 and FIG. 7 are the metallographic photos of Example 2.
Figure 7:
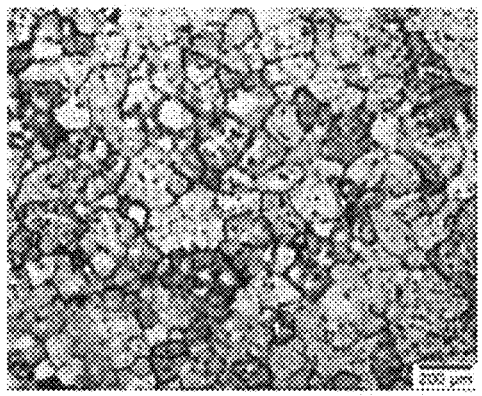

In this example, the same method as in Example 1 is applied to prepare A1-4.5Cu aluminum alloy ingot. The settings comprise: liquid aluminum temperature being 700° C., the nozzle diameter being 6 mm, the horizontal moving speed of the condensing table being 260 mm/s, and the spray area of the array nozzles being 2 m*5 m, and the thickness of the ingot being 0.8 m, and it takes 60 minutes to prepare a large-sized ingot of 2 m*5 m*0.8 m. The solidified structure of the ingot is dense, without macroscopic segregation, and is equiaxed crystal with an average grain size of 60-90 μm. The metallographic photos at ¼ and ½ along the center line of the cross section of the ingot are shown in FIG. 6 and FIG. 7, respectively.

The specific embodiments above may be partially adjusted by those skilled in the art in different ways without departing from the principle and purpose of the present disclosure. The protection scope of the present disclosure should be based on the claims and is not limited by the specific embodiments above. All implementation solutions within the scope thereof are bound by the present disclosure.

What is claimed is:

1. An array-spraying additive manufacturing apparatus for a equiaxed crystal aluminum alloy ingot, comprising:
    a liquid aluminum spraying mechanism having array nozzles and disposed in an atmospheric pressure chamber, and a movable condensing mechanism and a controller which are disposed in the atmospheric pressure chamber and below the liquid aluminum spraying mechanism, wherein the controller sends an upward guiding command to a release controller and issue a three-dimensional movement command to the movable condensing mechanism respectively, such that liquid aluminum in the liquid aluminum spraying mechanism is sprayed to a surface of the movable condensing mechanism in a form of a continuous array of liquid flows according to a preset path, and is rapidly condensed to form the ingot; and
    the liquid aluminum spraying mechanism comprises: the release controller, a liquid aluminum chamber, and array nozzles, wherein the array nozzles are disposed at a bottom of the liquid aluminum chamber, and the release controller is connected with the controller to control a spraying speed of the liquid aluminum;
    a nozzle row spacing and a nozzle column spacing of the array nozzles are less than 300 mm, and a nozzle aperture is 0.2 mm-30 mm; and a single-pass movement length of a single nozzle is equal to the nozzle column spacing, and a total width of movement of the single nozzle is equal to the nozzle row spacing;

the movable condensing mechanism comprises: a condensing table disposed right facing the array nozzles, a two-dimensional movement controller, the two-dimensional movement controller being vertically movable and disposed under the condensing table, and a downward movement controller, wherein the two-dimensional movement controller and the downward movement controller are respectively connected to the controller, and receive two-dimensional movement command and vertical movement command so as to realize three-dimensional movement and combined control is adopted for geometric arrangement of the array nozzles, cooling capacity of the condensing mechanism and a two-dimensional movement path, to make the liquid aluminum spread and be continuously kept in a semisolid state at a printing interface, thereby achieving metallurgical combination of a printing area corresponding to each nozzle.

2. The apparatus according to claim 1, wherein the atmospheric pressure chamber is provided with a vacuum pump connected to the controller, such that internal air pressure is further adjusted through the vacuum pump; and the atmospheric pressure chamber is connected with an inert gas source to provide inert gas protection for inside of the atmospheric pressure chamber.

3. The apparatus according to claim 1, wherein the release controller comprises an upward movement controller and a plug pole, wherein the plug pole is matched with the array nozzles, and the upward movement controller is respectively connected with the plug pole and the controller, thereby receiving a release command and controlling the plug pole to lift upward to release the array nozzles.

4. The apparatus according to claim 1, wherein in-chamber heaters which are connected with the controller are further disposed inside the liquid aluminum chamber.

5. The apparatus according to claim 1, wherein nozzle heaters are further disposed outside of the array nozzles.

6. The apparatus according to claim 1, wherein a cooling liquid flow channel is disposed inside the condensing table.

7. The apparatus according to claim 1, wherein the controller comprises: a movement controller and a general controller, wherein the movement controller is connected to the general controller and transmits movement information of the movable condensing mechanism, and the general controller is connected with the release controller and the vacuum pump respectively and transmits information of movement of the release controller and information of opening and closing of the vacuum pump, is connected with the two-dimensional movement controller and configured to transmit movement information of the two-dimensional movement controller, is connected with the downward movement controller and transmit movement information of the downward movement controller.

8. An array-spraying additive manufacturing method for manufacturing a equiaxed crystal aluminum alloy ingot based on the apparatus according to claim 1, comprising following steps:

Step 1: placing a plug pole in a lowest position to make the nozzles in a closed state; turning on in-chamber heaters for performing preheating to reach a liquid aluminum temperature and keeping the temperature; opening an inlet gate to allow the liquid aluminum to flow into the liquid aluminum chamber, and closing the inlet gate after the liquid aluminum is controlled by a liquid level meter to reach a preset height, turning on nozzle heaters to preheat the nozzles, sealing an airtight condensing chamber, and turning on the vacuum pump to vacuum the airtight condensing chamber; and turning off the vacuum pump when a vacuum degree meets a requirement, and introducing inert gas from an inert gas source to reach a preset pressure;

Step 2: turning on cooling water, controlling the downward movement controller by a movement controller, the movement controller connected to the general controller and transmitting movement information of the movable condensing mechanism, so as to make a distance between the nozzles and the condensing table reach a preset distance, then turning on a two-dimensional movement controller to enable the nozzles to move relative to the condensing table periodically and repeatedly; turning on an upward movement controller to lift upward the plug pole, so as to make the liquid aluminum enter the nozzles, the upward movement controller connected with the plug pole and the controller; turning on the vacuum pump to perform pumping to make a pressure of an airtight condensing chamber less than 1 atm, wherein the liquid aluminum in the liquid aluminum chamber above the airtight condensing chamber is sprayed out as stable liquid columns through the nozzles under above-mentioned negative pressure generated inside the airtight condensing chamber, and sprayed onto the condensing table to form the ingot; and controlling, after ingot preparation starts, the downward movement controller to move the condensing table downward, wherein during the ingot preparation process, with continuous consumption of the liquid aluminum, when a liquid level in the liquid aluminum chamber drops to a warning level, the inlet gate is opened to replenish the liquid aluminum until reaching a stable level, and then the inlet gate is closed; and Step 3: turning off, upon preparation of the ingots is completed, the plug pole to block flowing of the liquid aluminum out from the nozzles, turning off the two-dimensional movement controller and the downward movement controller, turning off a heating power supply, and turning off the cooling water after the ingot is cooled, thus finishing the preparation process.

* * * * *